United States Patent
Beattie et al.

(10) Patent No.: US 6,741,408 B2
(45) Date of Patent: May 25, 2004

(54) THERMALLY STABLE MOUNTING FOR A DIFFRACTION GRATING DEVICE

(75) Inventors: Jim Beattie, Nashua, NH (US); Ian Turner, Stratham, NH (US); Ninghui Zhu, Winchester, MA (US)

(73) Assignee: Confluent Photonics Corporation, Andover, MA (US)

( * ) Notice: Subject to any disclaimer, the term of this patent is extended or adjusted under 35 U.S.C. 154(b) by 0 days.

(21) Appl. No.: 09/751,042

(22) Filed: Dec. 29, 2000

(65) Prior Publication Data

US 2002/0181128 A1 Dec. 5, 2002

Related U.S. Application Data

(60) Provisional application No. 60/212,099, filed on Jun. 15, 2000.

(51) Int. Cl.[7] ............................. G02B 7/02; H04J 14/00
(52) U.S. Cl. ....................................... 359/820; 359/115
(58) Field of Search ............................ 359/820, 566, 359/569, 570, 571, 572, 576, 115, 124, 127, 558; 385/33, 37

(56) References Cited

U.S. PATENT DOCUMENTS

| 4,718,056 A | 1/1988 | Schultheiss .................... 370/3 |
| 4,763,969 A | 8/1988 | Khoe et al. ................. 359/512 |
| 5,035,495 A | 7/1991 | Toyoda et al. ................ 385/37 |

(List continued on next page.)

FOREIGN PATENT DOCUMENTS

| EP | 0 123 237 | 4/1984 |
| EP | 0123237 | 10/1984 |
| EP | 0727681 A2 | 8/1996 |
| EP | 0942265 A2 | 9/1999 |
| EP | 1041411 A2 | 10/2000 |
| JP | 58009119 | 1/1983 |
| JP | 06331850 | 12/1994 |
| JP | 6-331850 | 12/1994 |
| WO | WO 0120372 | 3/2001 |

OTHER PUBLICATIONS

Hastings and Montgomery, "Support of Cooled Components in Astronomical Instruments", Cryogenics 1993, vol. 33, No. 11, p. 1032–1036.

PCT Transmittal of ISR dated Mar. 26, 2002.

Fischer, Robert E.: *Optical Design for the Infrared;* SPIE vol. 0531, Geometrical Optics, ed. Fischer, Price, Smith; Jan. 1985; pp. 81–119.

Roberts, Michael; *Athermalisation of Infrared Optics: A Review;* SPIE vol. 10149, Recent Trends in Optical Systems Design and Computer Lens Design Workshop II, ed., R. E. Fischer, R. C. Juergens; Jun. 1989; pp. 55–64.

Jamieson, Thomas H.: *Thermal Effects in Optical Systems;* Optical Engineering; Mar./Apr. 1981; vol. 20, No. 2; pp. 156–160.

(List continued on next page.)

*Primary Examiner*—Georgia Epps
*Assistant Examiner*—Saeed Seyrafi
(74) *Attorney, Agent, or Firm*—Hunton & Williams LLP

(57) ABSTRACT

A wavelength division multiplexer (WDM) including a support structure that is coupled to at least one optical component. A diffraction grating is optically coupled to at least one optical component coupled to the at least one optical component. A frame is coupled to the diffraction grating. Pins may be coupled between the support structure and the frame to substantially thermally isolate the support structure from the frame. The pins may be substantially geometrically equally spaced and have approximately the same exposed length extending from the lens barrel. The pins may have the same coefficient of thermal expansion as the support structure.

57 Claims, 6 Drawing Sheets

U.S. PATENT DOCUMENTS

| | | | |
|---|---|---|---|
| 5,799,118 A | | 8/1998 | Ogusu et al. ................. 385/14 |
| 5,991,482 A | | 11/1999 | Laude ......................... 385/37 |
| 6,008,492 A | * | 12/1999 | Slater et al. ................ 250/334 |
| 6,011,884 A | | 1/2000 | Dueck et al. ................. 385/24 |
| 6,134,359 A | * | 10/2000 | Keyworth et al. ............ 385/33 |
| 6,147,341 A | * | 11/2000 | Lemaire et al. ........ 250/227.17 |
| 6,169,838 B1 | | 1/2001 | He et al. .................... 385/129 |
| 6,185,043 B1 | | 2/2001 | Imamura ................... 359/619 |
| 6,307,657 B1 | | 10/2001 | Ford .......................... 359/130 |
| 6,343,169 B1 | * | 1/2002 | Dempewolf et al. .......... 385/37 |
| 6,374,015 B1 | * | 4/2002 | Lin .............................. 385/37 |
| 6,381,387 B1 | | 4/2002 | Wendland, Jr. .............. 385/37 |

OTHER PUBLICATIONS

Hudyma, Russell M.: *Athermal MWIR Objectives;* SPIE vol. 2640, Current Developments in Optical Design and Engineering V, ed., R. E. Fischer, W. J. Smith; Sep. 1995; pp. 229–235.

Olivieri, M.: *Analysis of Defocusing Thermal Effects in Optical Systems;* SPIE vol. 2774, Design and Engineering of Optical Systems, ed., J. J. Braat; Aug. 1996; pp. 283–292.

Hastings, et al, "Support of Cooled Components in Astronomical Instruments", Cryogenics 1993, vol. 33, No. 11, pp. 1032–1036.

PCT Notification of Transmittal of ISR, dated Mar. 26, 2002.

* cited by examiner

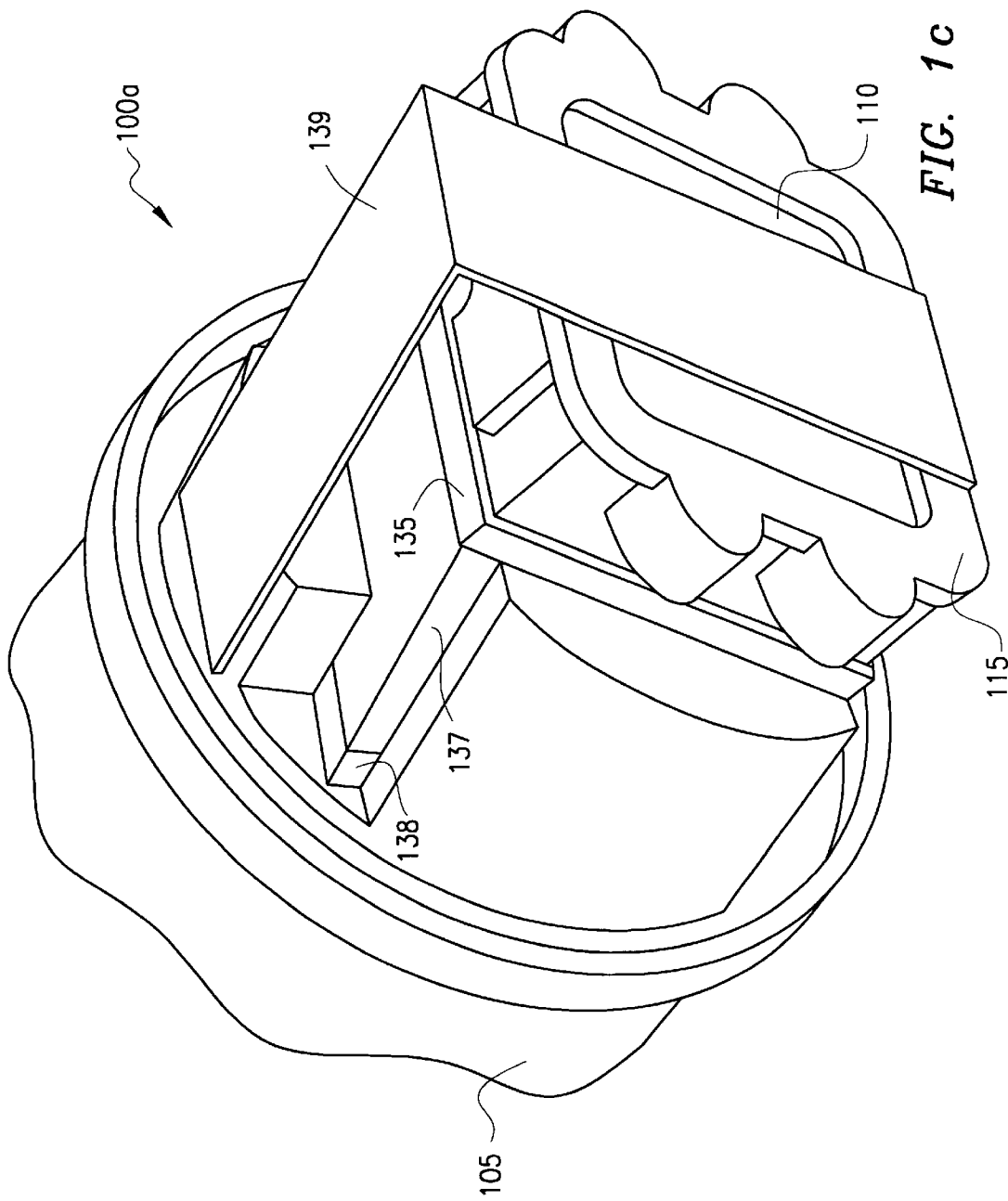

THERMALLY STABLE MOUNTING FOR A DIFFRACTION GRATING DEVICE

CROSS-REFERENCE TO RELATED APPLICATIONS

This patent application is related to and claims priority from U.S. Provisional Patent Application No. 60/212,099, filed Jun. 15, 2000, which is hereby incorporated by reference herein in its entirety.

BACKGROUND OF THE PRESENT INVENTION

1. Field of the Invention

The present invention relates generally to wavelength division multiplexing/demultiplexing, and more specifically, a mounting for a diffraction grating.

2. Description of the Related Art

The telecommunications industry has grown significantly in recent years due to developments in technology, including the Internet, e-mail, cellular telephones, and fax machines. These technologies have become affordable to the average consumer such that the volume of traffic on telecommunications networks has grown significantly. Furthermore, as the Internet has evolved, more sophisticated applications have increased data volume being communicated across the telecommunications networks.

To accommodate the increased data volume, the infrastructure of the telecommunications networks has been evolving to increase the bandwidth of the telecommunications networks. Fiber optic networks that carry wavelength division multiplexed optical signals provide for significantly increased data channels for the high volume of traffic. An important component of the fiber optic networks is a wavelength division muitiplexer/demultiplexer (WDM). The WDM is utilized to multiplex and/or demultiplex the wavelength division multiplexed optical signals in the fiber optic networks.

The WDM includes optical components that, in the case of demultiplexing, separate polychromatic optical signals into monochromatic or narrowband optical signals, and, in the case of multiplexing, combine monochromatic optical signals into polychromatic signals. The optical components of the WDM generally include lenses for focusing and collimating the optical signals and a diffraction grating for diffracting the optical signals to perform the multiplexing and demultiplexing functions. A diffraction grating component generally comprises an elastomer material, such as epoxy, on which the diffraction grating profile is pressed; an optical reflective coating, such as gold or aluminum, that is coated onto the elastomer; and a substrate on which the elastomer material is attached. The substrate provides thermal stability to maintain groove spacing over the operating temperature of the diffraction grating.

A support structure is used to either mount or house the optical components of the WDM. To maintain optical fidelity of the WDM, the diffraction grating should be aligned and maintained at a particular position from the last optical component prior to the diffraction grating. Maintaining the diffraction grating at the particular position, however, is non-trivial due to thermal characteristics of the support structure. Based on the coefficient of thermal expansion (CTE) of the material of the support structure, conventional support structures may undesirably change size over a temperature range that extends from −40C to +85C, thereby causing an undesirable change of position of the diffraction grating.

SUMMARY OF THE INVENTION

To overcome the problem of maintaining a particular position of a diffraction grating in relation to a last optical component prior to the diffraction grating in a wavelength division multiplexer (WDM), the diffraction grating is thermally isolated from a support structure that supports the other optical components of the WDM. The diffraction grating may be thermally isolated from the support structure by utilizing pins that couple the support structure and the diffraction grating. The pins may be thermally matched to the support structure of the WDM.

One embodiment of the WDM includes a support structure that is coupled to the at least one optical component. A diffraction grating is optically coupled to at least one optical component coupled to the support structure. A frame supports the diffraction grating. Pins are coupled between the support structure and the frame so as to substantially thermally isolate the frame from the support structure. The pins may be substantially geometrically equally spaced along the support structure and have approximately the same exposed length extending from the support structure. The pins may have the same coefficient of thermal expansion as the coefficient of thermal expansion of the support structure.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1c is an alternate embodiment for supporting the diffraction grating according to the principles of the present invention;

FIG. 2 is a schematic of an exploded parts view of a WDM having a mounting for a diffraction grating according to FIG. 1a;

FIG. 3 is a schematic of a frame having four pins connected to the frame according to FIG. 1a;

FIG. 5 is a block diagram of a system having a WDM that includes pins for positionally stabilizing a diffraction grating according to FIG. 1a.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Wavelength division multiplexers (WDM) include optical components, such as lenses, prisms, and a diffraction grating, for example. The optical components of the WDM are mechanically supported by a support structure, such as a lens barrel or a base plate. Maintaining the diffraction grating at a particular position relative to a last optical component prior to the diffraction grating improves the performance of the WDM over a temperature range, such as −40C to +85C. Maintaining the relative particular position of the diffraction grating is non-trivial as the support structure is affected by thermal conditions and variations in the size of the support structure due to the coefficient of thermal expansion of the material of the support structure.

One technique, according to the principles of the present invention, to mechanically stabilize the particular position of the diffraction grating relative to the last optical component prior to the diffraction grating is to couple pins between the support structure and a frame coupled to the diffraction grating. Alternatively, the pins may couple the support structure and the substrate of the diffraction grating directly. In the case of the support structure being a lens barrel, the use of multiple pins being coupled geometrically substantially equally spaced to the lens barrel provides for the position of the diffraction grating in relation to the last optical component in an optical path prior to the diffraction grating to be substantially stable over the operating temperature range of the WDM. The lens barrel may be cylindrical, however, any other shaped support structure is contemplated by the principles of the present invention. By utilizing pins to couple the diffraction grating, optionally supported by a frame, to the support structure, the diffraction grating is substantially thermally isolated from the support structure. And, by matching the coefficient of thermal expansion (CTE) of the pins to the CTE of the support structure (e.g., lens barrel), the connections of the pins to the lens barrel are further protected.

Figure 1A:
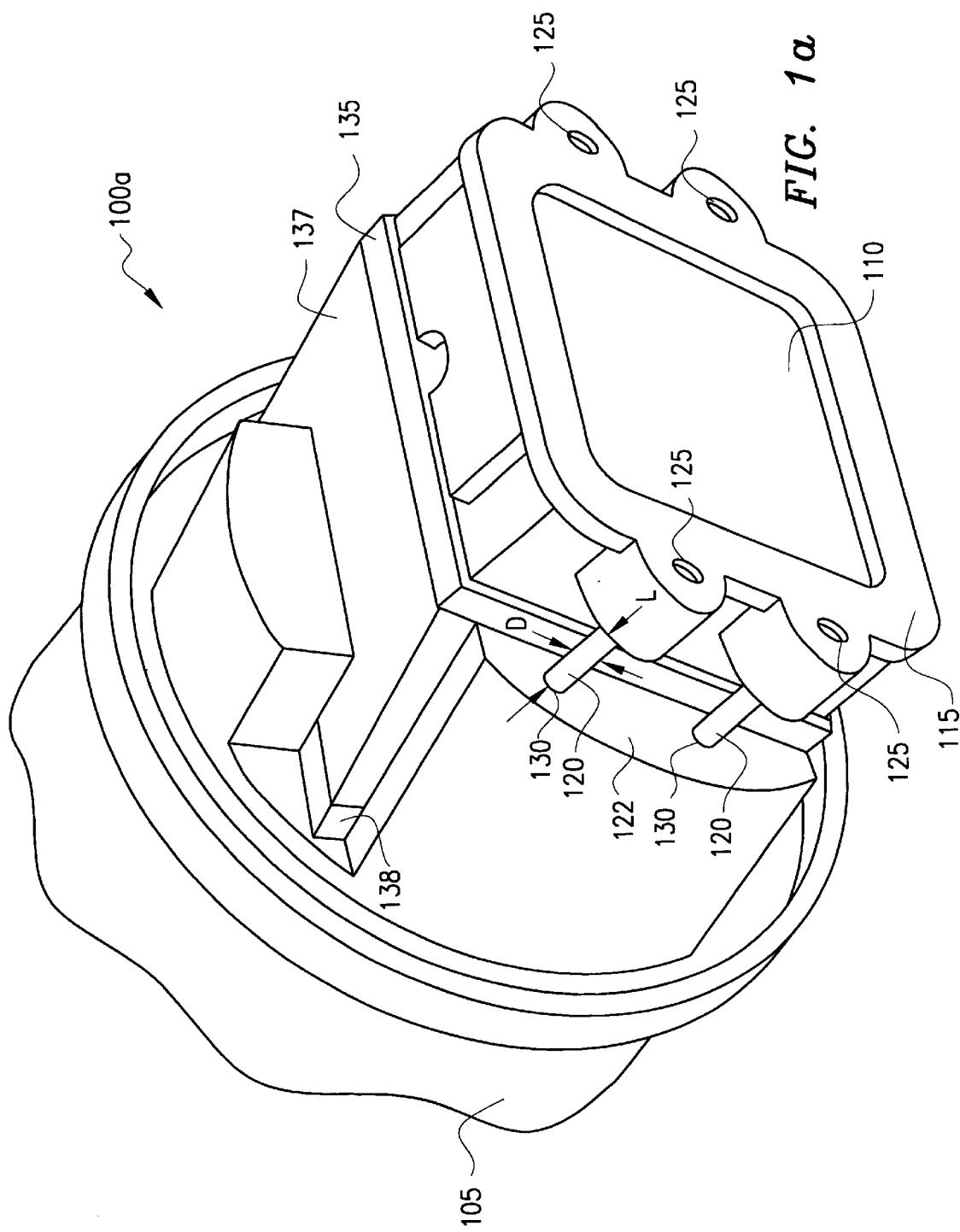
FIG. 1a is a schematic of one end of a wavelength division multiplexer (WDM) having a mounting for a diffraction grating according to an embodiment of the present invention.

FIG. 1a is a schematic of one end of a wavelength division multiplexer (WDM) 100a. The WDM 100a includes a lens barrel 105 that houses and/or supports optical components for performing wavelength division multiplexing operations. One optical component of the WDM is a diffraction grating 110. The diffraction grating is used to diffract optical signals as a function of wavelength to combine monochromatic optical signals into a polychromatic optical signal (multiplexing) or separate a polychromatic optical signal into monochromatic optical signals (demultiplexing).

Figure 1B:
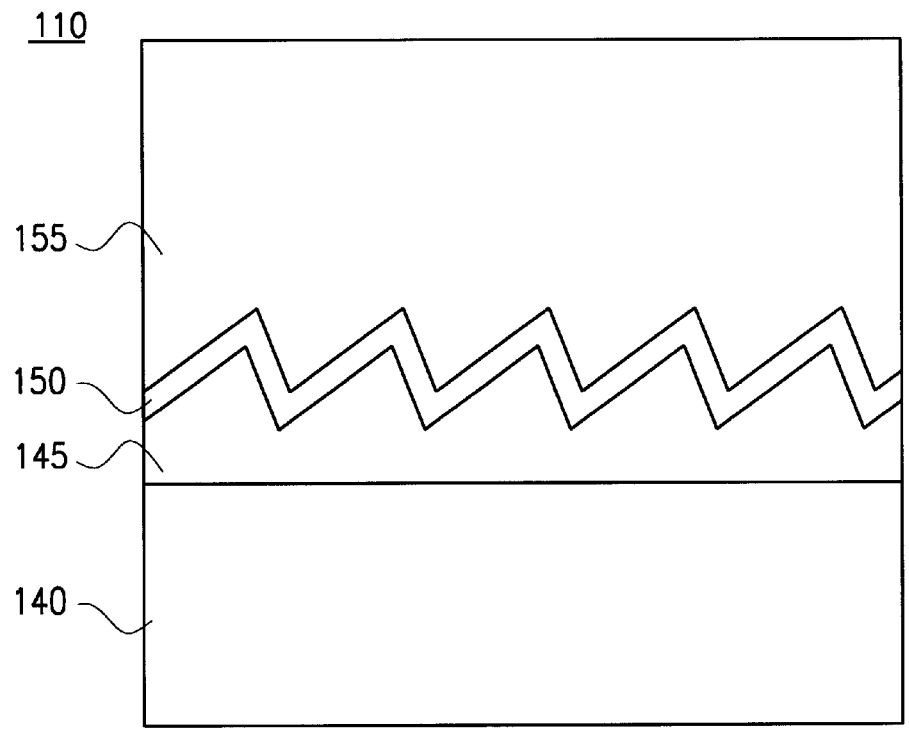
FIG. 1b is a representative diffraction grating assembly.

Referring to FIG. 1b, a structure for a diffraction grating assembly 110 is shown. The diffraction grating 110 includes a substrate 140 that provides thermal stability to which a diffraction grating layer 145 is coupled. The substrate 140 may be fused silica, silicon carbide, metal, ceramic, or glass. However, any material having a CTE below about 1.0 PPM/C is capable of being used for the substrate 140.

The diffraction grating layer 145 is formed over and/or bonded to a surface of the substrate 140. An exposed surface of diffraction grating layer 145 includes a grating profile. The grating profile of the diffraction grating layer 145 may be formed a number of different ways, including the utilization of ruling or holographic techniques, as is known in the art. The particular grating profiles and corresponding characteristics of the diffraction grating layer 145 are not of particular concern with respect to the principles of the present invention. However, the diffraction grating profile may be blazed, sinusoidal, rectangular, triangular, echelle, echelette, echelon, or any other diffraction grating profile that provides for multiplexing and/or demultiplexing functionality for the WDM 100a. Additionally, the substrate 140 may be curved so that the diffraction grating profile is constructed on a curved surface.

A reflective layer 150 is formed over and/or bonded to the exposed surface of the grating layer 145. Reflective layer 150 substantially forms the particular grating profile of the grating layer 145. Reflective layer 150 may be a metallic composition, such as gold, aluminum or silver.

An optically transmissive material or coating 155 may be disposed over or adjacent to the reflective layer 150. The transmissive material 155 is utilized to increase the reflectivity of the diffraction grating. The transmissive material 155 is shown in FIG. 1b as being formed directly over the reflective layer 150. It is understood, however, that an additional layer (not shown), such as a bonding agent having a different index of refraction relative to the transmissive material 155, may be disposed between the transmissive material 155 and the reflective layer 150.

It is understood that the diffraction grating 110 may include additional or fewer layers than described above. For example, a surface of the substrate 140 may be worked so as to form a diffraction grating profile thereon, and the reflective layer 150 bonded to or formed directly on the substrate 140. Alternatively, a thickness of the reflective layer 150 may be sufficiently dimensioned so that a surface of the reflective layer 150 may be worked to form a grating profile thereon, thereby rendering the substrate 140 and the diffraction grating layer 145 unnecessary. The diffraction grating 110, however, is herein presented as a three-layer diffraction grating for exemplary purposes.

Referring again to FIG. 1a, a frame 115 is used to mount the diffraction grating 110 to lens barrel 105. The diffraction grating 110 may be bonded to the frame 115 using an epoxy adhesive, soldering, metalizing and soldering, or bonding via any other technique that rigidly holds the diffraction grating assembly 110 to the frame 115.

The material of the substrate 140 is generally fused silica, glass, metal, or ceramic. Preferably, the coefficient of thermal expansion (CTE) of the frame 115 is substantially dynamically thermally matched to the CTE of substrate 140 to prevent delamination or separation of the frame 115 from the diffraction grating 110. One material to facilitate substantially dynamically thermally matching the frame 115 to the substrate 140 is invar. Invar is a stainless type of metal that has a very low CTE, which is virtually identical to the CTE of the substrate 140 (e.g., fused silica) of the diffraction grating 110. One type of invar, "invar 36", is preferred. However, any material having a CTE between about 1.0 and about 1.2 PPM/C may be utilized for the frame 115.

Four pins 120, for example, are mounted in substantially equally spaced positions on and/or are disposed substantially uniformly about a mounting surface 122 of the lens barrel 105. Alternatively, two or more pins 120 could be utilized to mount the frame 115 to the lens barrel 105, including the bottom, top, and sides. The pins 120 may be extending outward the same length relative to the mounting surface 122 of the lens barrel 105. However, if more than one support surface exists, the pins 120 are dimensionally set such that a proper angle of the diffraction grating 110 is maintained. The pins 120 are preferably press-fit into frame pin openings 125 on the frame 115. However, any other method that permanently or non-permanently attaches the pins 120 into the frame 115 is suitable according to the principles of the present invention, such as welding or using set-screws for the pins 120 to be set in the frame pin openings 125.

Lens barrel pin openings 130 on the mounting surface 122 of the lens barrel 105 are used to secure the pins 120 to the lens barrel 105. The pins 120 may be secured to the lens barrel pin openings 130 using the same techniques as the pins 120 are secured to the frame pin openings 125.

The pins 120 are of sufficient diameter to be stiff enough to rigidly hold the frame 115 in place and small enough in diameter to flex when the material of the lens barrel 105 dimensionally changes with temperature. This flexibility allows the pins 120 to flex and move equally or substantially equally to maintain the same angle, position, and/or orientation of the diffraction grating assembly 110 relative to a last optical component, such as a prism 137 or collimating lens system (not shown), within the lens barrel 105 prior to the diffraction grating 110. One embodiment of the pins 120 includes an outer diameter (D) of 0.0625 inches and a length (L) of 0.25 inches, where the length is the exposed length of the pins between the lens barrel 105 and the frame 115. The stiffness of the pins 120 is determined by the outer diameter.

The CTE of the pins 120 are preferably substantially dynamically thermally matched to the lens barrel 105. The uslens barrel 105 and the pins 120 may be stainless steel in the American Iron and Steel Institute (AIST) standard. Specific stainless steel types include the following: 416, 410, and 412. However, any metal or non-metal having a CTE of between about 9.5 and about 10.5 PPM/C may be utilized. By matching the CTE of the pins 120 to the CTE of the lens barrel 105, the connection of the pins 120 to the lens barrel 105 via the lens barrel pin openings 130 is protected from thermal stresses. The CTE of the pins 120 alternatively may be substantially dynamically thermally matched to the frame 115.

An air space between the diffraction grating 110 and the lens barrel 105 may be included as shown in FIG. 1a. The air space helps to provide the thermal isolation between the lens barrel 105 and the diffraction grating 110. A diffraction grating cover 135 also may be coupled to the lens barrel 105. It should be noted that the diffraction grating 110 and the frame 115 may be protected with a covering (not shown) that is secured to the lens barrel 105.

FIG. 1c is an alternate embodiment of the end of the WDM 100a for supporting the diffraction grating according to the principles of the present invention. Rather than utilizing pins 120 as included in FIG. 1a, a bracket 139 is coupled from the lens barrel 105 to the frame 115. Alternatively, the bracket 139 may couple the lens barrel 105 and the diffraction grating 110 directly. Similar to the use of pins 120, there exists an air gap between the lens barrel 105 and the diffraction grating 110. The bracket 139 may have a substantially similar CTE as the CTE of the lens barrel 105 and may be connected to the lens barrel 105 via a lens barrel slot opening (not shown), welding, epoxying or any other way to fixedly connect the bracket 139 to the lens barrel 105. It should be understood that mounting mechanisms to secure the pins 120 or bracket 139 are contemplated by the principles of the present invention, including set-screws and bolts.

Furthermore, the principles of the present invention allow for alternate mechanisms to couple the frame 115 to the lens barrel 105. For example, straps having a rectangular, square, oval, or any other geometrical shape could be utilized. The straps, of course, would have the same thermal properties and have the same or substantially same stiffness and flexibility as previously discussed with regard to the pins 120.

Figure 2:
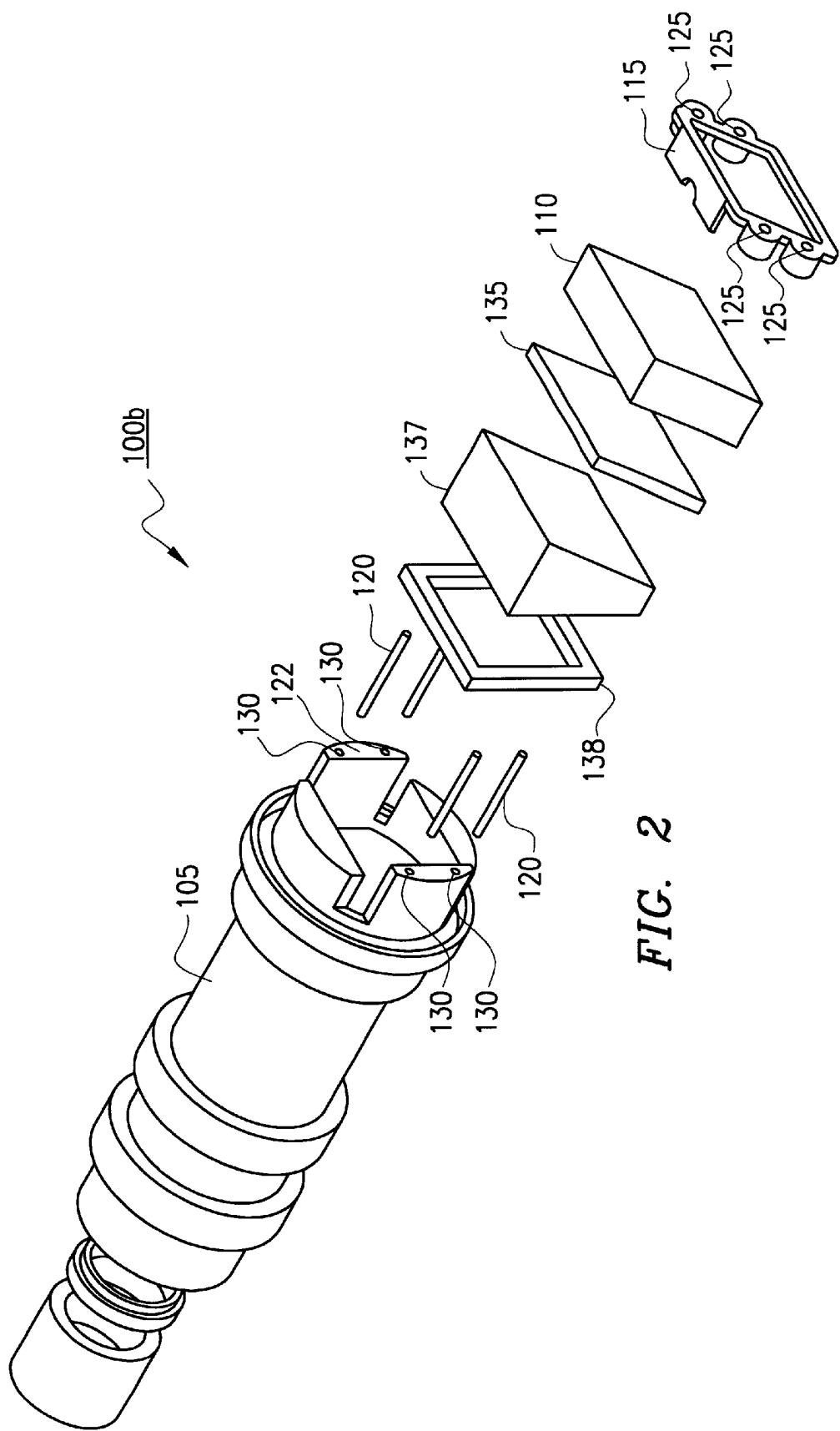

FIG. 2 shows an exploded parts view of a complete WDM 100b. The view includes a breakdown of the lens barrel 105, lens barrel 105 and diffraction grating coupling elements, and diffraction grating, including: the frame 115, diffraction grating 110, diffraction grating cover 135, prism 137, prism mount frame 138, and four pins 120. The four lens barrel pin openings 130 are geometrically substantially equally spaced along the mounting surface 122 of the lens barrel 105. Again, the pins 120 are coupled to the lens barrel 105 via epoxy, pressed, welded, laser welded, electron beam welded, or any other way to permanently affix the pins 120 to the lens barrel 105. Alternatively, the pins 120 can be non-permanently connected to the lens barrel 105 by using, for example, set-screws and/or bolts. The pins 120 are coupled directly from the frame 115 to the lens barrel 105, but it is conceivable that the pins 120 could be connected to a secondary structure and the secondary structure to the lens barrel 105 or the frame 115. In another embodiment, the coupling element(s) (e.g., pins 120) can be connected directly to the diffraction grating 110.

Figure 3:
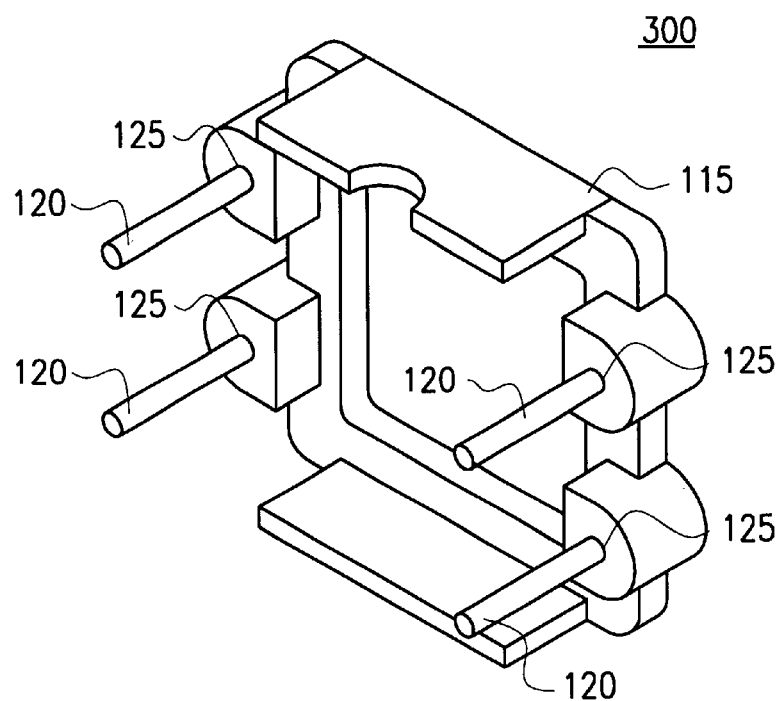

FIG. 3 is a schematic 300 of the frame 115 coupled to the pins 120. The pins 120 are coupled to frame pin openings 125 as previously described. The frame 115 may be geometrically shaped to support the diffraction grating 110 of the WDM. As previously discussed, the material of the frame 115 has a CTE that is substantially similar to the substrate 140 of the diffraction grating 110 to prevent adverse thermal effects to the bonding of the diffraction grating 110 to the frame 115.

Figure 4:
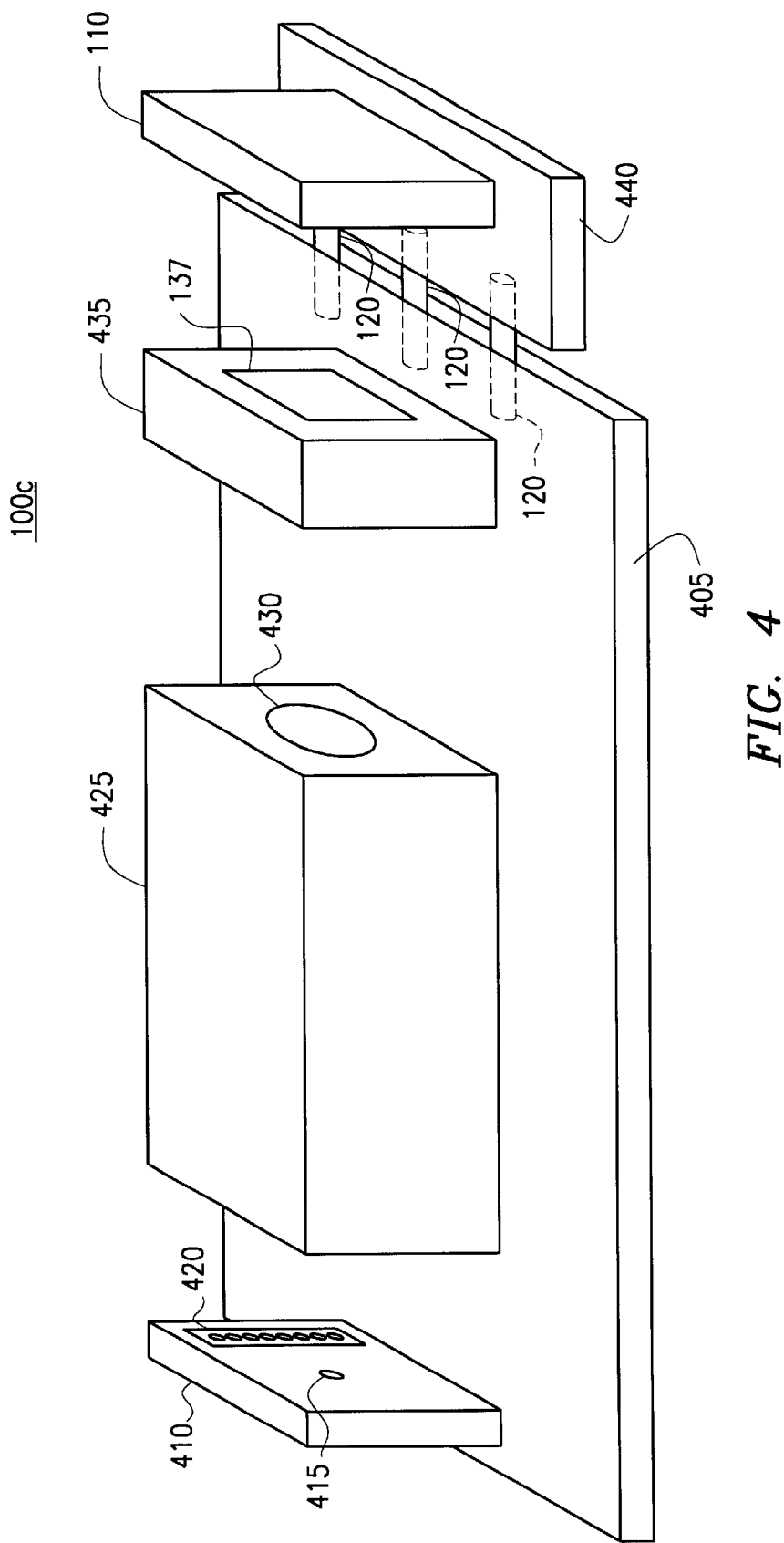
FIG. 4 is a schematic of an alternate embodiment of a support structure for the wavelength division multiplexer.

FIG. 4 is a schematic of an alternate embodiment of a support structure for a wavelength division multiplexer 100c. A base plate 405 provides a surface for the optical components of WDM 100c to be mounted. The optical components may include a connection stand 410 for supporting a fiber optic connector 415 for a fiber optic line that carries polychromatic optical signals and an array of optic connectors 420 for an array of fiber optic lines that carry monochromatic optical signals. An optical component support structure 425 for mounting optical components, such as a collimating lens system 430 may be mounted on the base plate 405. Alternatively, each optical component may be mounted individually on the base plate 405. Another connection stand 435 mounted to the is base plate 405 may be used to support the prism 137.

Pins 120 may be coupled to the base plate 405 and a secondary base plate 440 for supporting the diffraction grating 110. The secondary base plate 440 should have a CTE that substantially matches the substrate of the diffraction grating 110 or a frame (not shown) that supports the diffraction grating 110. The pins 120 are geometrically substantially equally spaced along secondary base plate 440 and provide substantial thermal isolation between the base plate 405 and the secondary base plate 440. The pins 120 provide a gap between the two base plates 405 and 440. The CTE of the pins 120 may be matched to the CTE of the base plate 405 or to the CTE of the secondary base plate 440 to thermally isolate the base plate 405 from the secondary base plate 440, thereby reducing thermal stresses at the connections of the pins to the base plate having the CTE matching the CTE of the pins 120.

While the embodiment of FIG. 4 shows a support structure (i.e., base plate 405) that is flat, the principles of the present invention contemplate other geometric shapes. For example, a square, oval, hexagonal, or pentagon could be utilized for the support structure. The pins 120 would simply be geometrically substantially equally spaced along the support structure and the diffraction grating to avoid unequal load distribution on the pins 120.

Figure 5:
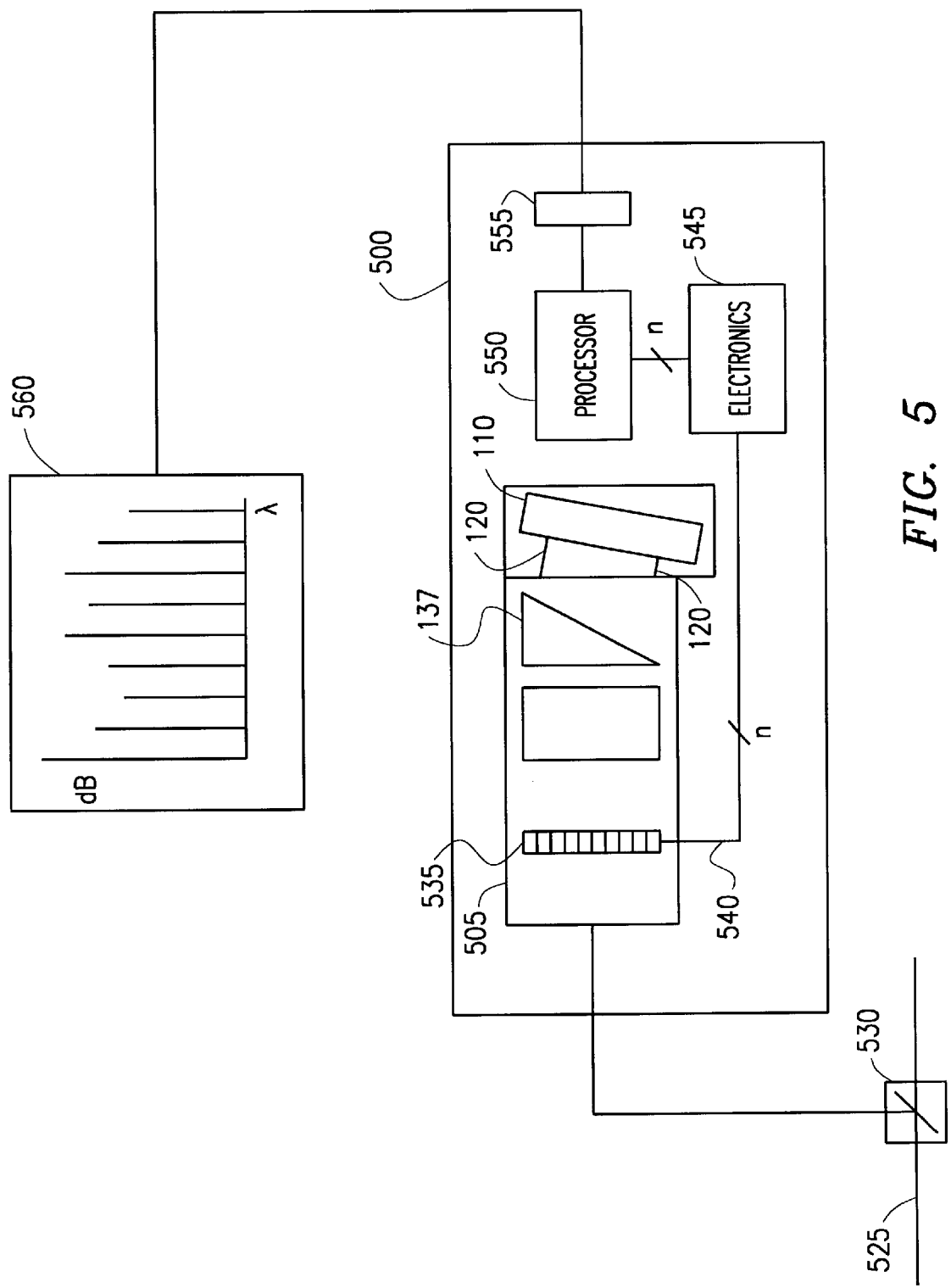

FIG. 5 is a block diagram of a system 500 having a modified WDM 505 that includes the pins 120 for positionally stabilizing the diffraction grating 110 relative to a last optical component prior to the diffraction grating 110 within the modified WDM 505. The system 500 may be a spectrometer or an optical performance monitor (OPM) used to measure and display power of monochromatic optical signals forming a polychromatic optical signal traveling through a fiber optic line 525. An optical splitter 530 is used to extract a percentage of the polychromatic optical signal from the fiber optic line 525 and direct the extracted polychromatic optical signal to the spectrometer 500.

The modified WDM 505 is modified from the WDMs 100a–100c as presented in FIGS. 1–4. Rather than focusing the monochromatic optical signals after diffracting the polychromatic optical signal into individual fiber optic lines (not shown) for adding and/or dropping the monochromatic optical signals onto an optical network, a sensor array 535 receives the focused monochromatic optical signals (not shown). The sensor array 535 outputs signals representative of the measured power for each monochromatic optical signal focused on the sensor array 535 onto a bus 540. Electronics 545 process and/or convert the output signals of the sensor array 535 and communicate the processed signals to the processor 550 for further processing. The processor 550 communicates the further processed signals to a display driver 555, which drives a display 560 so that the power levels for each monochromatic optical signal can be displayed for a network operator to visually inspect. Alternatively, the display 560 maybe part of the system 500. The display 560 can display the power levels in power (dB) at each wavelength (λ), for example. The embodiment of the spectrometer 500 as shown is meant only to show the functionality of the spectrometer 500. It should be understood that the WDM may have alternate optical components to perform the same functionality.

The previous description is of a preferred embodiment for implementing the invention, and the scope of the invention should not necessarily be limited by this description. The scope of the present invention is instead defined by the following claims.

What is claimed is:

1. A wavelength division multiplexer/demultiplexer (WDM), comprising:
   a support structure coupled to at least one optical component;
   a diffraction grating optically coupled to said at least one optical component coupled to said support structure;
   a frame, said diffraction grating being supported by said frame; and
   a plurality of pins connecting said support structure and said frame, said plurality of pins substantially thermally isolating said frame from said support structure.

2. The WDM according to claim 1, wherein said pins are substantially geometrically equally spaced about said frame.

3. The WDM according to claim 1, wherein said pins are permanently coupled to said frame.

4. The WDM according to claim 3, wherein said permanent coupling includes at least one of the following: press-fit, epoxy bonded, soldered, and welded.

5. The WDM according to claim 1, wherein said pins are permanently coupled to said support structure.

6. The WDM according to claim 5, wherein said permanent coupling includes at least one of the following: press-fit, epoxy bonded, soldered, and welded.

7. The WDM according to claim 1, wherein said pins have approximately the same exposed length extending from said support structure.

8. The WDM according to claim 1, wherein said pins and said support structure have approximately the same coefficient of thermal expansion.

9. The WDM according to claim 1, wherein said diffraction grating includes a substrate.

10. The WDM according to claim 9, wherein said frame has approximately the same coefficient of thermal expansion as the coefficient of thermal expansion of the substrate.

11. The WDM according to claim 9, wherein the coefficient of thermal expansion of said substrate is about 1.0 PPM/C.

12. The WDM according to claim 9, wherein the substrate comprises at least one of the following materials: fused silica, glass, metal, silicon carbide, and ceramic.

13. The WDM according to claim 9, wherein the substrate is coupled to said frame.

14. The WDM according to claim 13, wherein the coupling of the substrate and said frame includes at least one of the following: epoxied, soldered, welded, and metalized and soldered.

15. The WDM according to claim 1, wherein said pins have approximately the same coefficient of thermal expansion as the coefficient of thermal expansion of said frame.

16. The WDM according to claim 1, wherein said frame is substantially thermally isolated from the support structure over a temperature range between about −40 Celsius and about +85 Celsius.

17. The WDM according to claim 1, wherein said frame comprises at least on e of the following materials: invar, metal, glass, and ceramic.

18. The WDM according to claim 1, wherein said support structure has a coefficient of thermal expansion between about 9.5 and about 10.5 PPM/C.

19. The WDM according to claim 1, wherein the support structure includes at least one of the following materials: 416, 410, and 412 stainless steel.

20. The WDM according to claim 1, wherein said support structure is a lens barrel.

21. The WDM according to claim 1, wherein said support structure includes a base plate.

22. The WDM according to claim 1, wherein a gap is included between said support structure and said frame.

23. An apparatus for stabilizing a position of a diffraction grating in relation to at least one optical component, the apparatus comprising:
   a support structure coupled to the at least one optical component;
   a frame coupled to said diffraction grating; and
   a plurality of pins coupling said frame to said support structure, said plurality of pins substantially thermally isolating said frame from said support structure over temperature variations.

24. The apparatus according to claim 23, wherein said frame is substantially thermally dynamically matched to said substrate.

25. The apparatus according to claim 23, wherein said pins are substantially dynamically thermally matched to said support structure.

26. The apparatus according to claim 23, wherein said pins are substantially dynamically thermally matched to said frame.

27. The apparatus according to claim 23, wherein said pins have substantially the same exposed length extending from said support structure.

28. The apparatus according to claim 23, wherein the temperature variations range from about −40 Celsius to about +85 Celsius.

29. The apparatus according to claim 23, wherein said support structure has a coefficient of thermal expansion of between about 9.5 and about 10.5 PPM/C.

30. The apparatus according to claim 23, wherein said pins are substantially equally spaced about said support structure.

31. The apparatus according to claim 23, wherein said pins are extended axially from said support structure.

32. The apparatus according to claim 23, wherein the coefficient of thermal expansion of said substrate is about 1.0 PPM/C.

33. The apparatus according to claim 23, wherein said support structure is a lens barrel.

34. A wavelength division multiplexer/demultiplexer (WDM), comprising:
    means for supporting at least one optical component;
    means for diffracting an optical signal, said means for diffracting being oriented at a set position relative to at least one optical component; and
    means for coupling said means for diffracting to said means for supporting at least one optical component, said means for coupling providing substantially the same relative position between said means for diffracting and the at least one optical component over a temperature range.

35. The WDM according to claim 34, wherein the position is an angle.

36. The WDM according to claim 34, wherein the temperature range comprises at least approximately 120 degrees Celsius.

37. The WDM according to claim 34, wherein said means for coupling is substantially dynamically thermally matched to said means for supporting at least one optical component.

38. The WDM according to claim 34, further comprising means for supporting said means for diffracting.

39. The WDM according to claim 38, wherein said means for supporting said means for diffracting is substantially dynamically thermally matched to at least one component forming said means for diffracting.

40. The WDM according to claim 34, wherein said means for coupling creates a gap between said means for diffracting and said means for supporting.

41. A wavelength division multiplexer/demultiplexer (WDM) comprising:
    a support structure for supporting at least one optical component, a diffraction grating optically coupled to the at least one optical component; and
    at least one coupling element coupling the diffraction grating to said support structure, the at least one coupling element substantially thermally isolating the diffraction grating from said support structure and having a coefficient of thermal expansion substantially the same as the coefficient of thermal expansion of said support structure.

42. The WDM according to claim 41, further comprising a frame coupled to the diffraction grating, said at least one coupling element has a coefficient of thermal expansion substantially the same as the coefficient of thermal expansion of said frame.

43. The WDM according to claim 41, wherein said support structure has a coefficient of thermal expansion between about 9.5 and about 10.5 PPM/C.

44. The WDM according to claim 41, wherein the diffraction grating includes a substrate, said substrate has a coefficient of thermal expansion about 1.0 PPM/C.

45. The WDM according to claim 41, wherein said at least one coupling element is cylindrically shaped.

46. The WDM according to claim 41, wherein said coupling elements are coupled to said support structure in substantially equal spacings.

47. The WDM according to claim 41, wherein said support structure is a lens barrel.

48. The WDM according to claim 41, wherein said at least one coupling element includes at least one of the following: a pin, a bracket, and a strap.

49. The WDM according to claim 41, wherein said at least one coupling element forms a gap between said support structure and the diffraction grating.

50. A system comprising:
    optical components;
    a support structure for supporting at least one optical component;
    a diffraction grating optically coupled to the at least one optical component; and
    at least one coupling element connecting said support structure to said diffraction grating so that an orientation of said diffraction grating relative to said optical components is substantially maintained over a temperature range the at least one coupling element having a coefficient of thermal expansion substantially the same as the coefficient of thermal expansion of said support structure.

51. The system according to claim 50, wherein the system multiplexes and demultiplexes monochromatic optical signals.

52. The system according to claim 50, wherein said support structure has a coefficient of thermal expansion between about 9.5 and about 10.5 PPM/C.

53. The system according to claim 50, wherein said diffraction grating includes a substrate, said substrate has a coefficient of thermal expansion about 1.0 PPM/C.

54. The system according to claim 50, wherein the system is includes at least one of the following: a spectrometer, optical performance monitor, and a wavelength division multiplexer.

55. A method for manufacturing a wavelength division multiplexer/demultiplexer (WDM), comprising:
    coupling at least one optical component to a first support structure; and
    substantially thermally matching at least one coupling element to the first support structure,
    connecting the first support structure utilizing the at least one coupling element to a diffraction grating so as to optically couple the diffraction grating to the at least one optical component, the diffraction grating being substantially thermally isolated from the first support structure.

56. The method according to claim 55, wherein the diffraction grating is connected to a second support structure.

57. A wavelength division multiplexer/demultiplexer (WDM) comprising:
    a support structure for supporting at least one optical component, a diffraction grating optically coupled to the at least one optical component;
    at least one coupling element coupling the diffraction grating to said support structure, the at least one coupling element substantially thermally isolating the diffraction grating from said support structure; and
    a frame coupled to the diffraction grating, said at least one coupling element has a coefficient of thermal expansion substantially the same as the coefficient of thermal expansion of said frame.

* * * * *